June 2, 1936.  T. H. NAKKEN  2,042,619

NOISELESS RECORDING

Filed July 30, 1932  3 Sheets-Sheet 1

INVENTOR
THEODORUS H. NAKKEN
BY
ATTORNEY

June 2, 1936.  T. H. NAKKEN  2,042,619
NOISELESS RECORDING
Filed July 30, 1932  3 Sheets-Sheet 2

INVENTOR
THEODORUS H. NAKKEN
BY
ATTORNEY

Patented June 2, 1936

2,042,619

UNITED STATES PATENT OFFICE 2,042,619

NOISELESS RECORDING

Theodorus H. Nakken, New York, N. Y., assignor to Nakken Patents Corporation, a corporation of Delaware Application July 30, 1932, Serial No. 626,380

1 Claim. (Cl. 179—100.3)

This invention relates to the making of noiseless photographic records of sound for sound-on-film motion picture functioning in particular, but, of course, is more broadly applicable to any noiseless photographic film record of sound.

Figure 3:
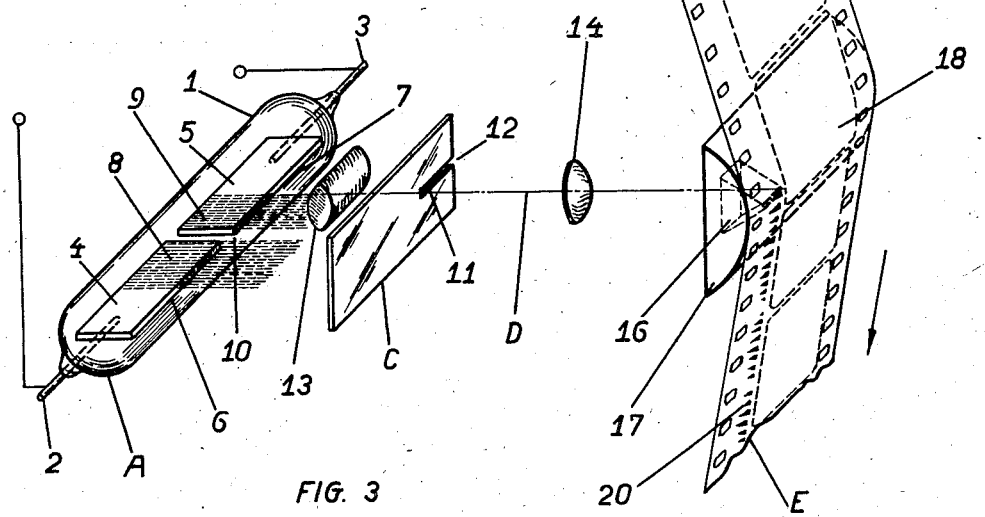
Figure 7:
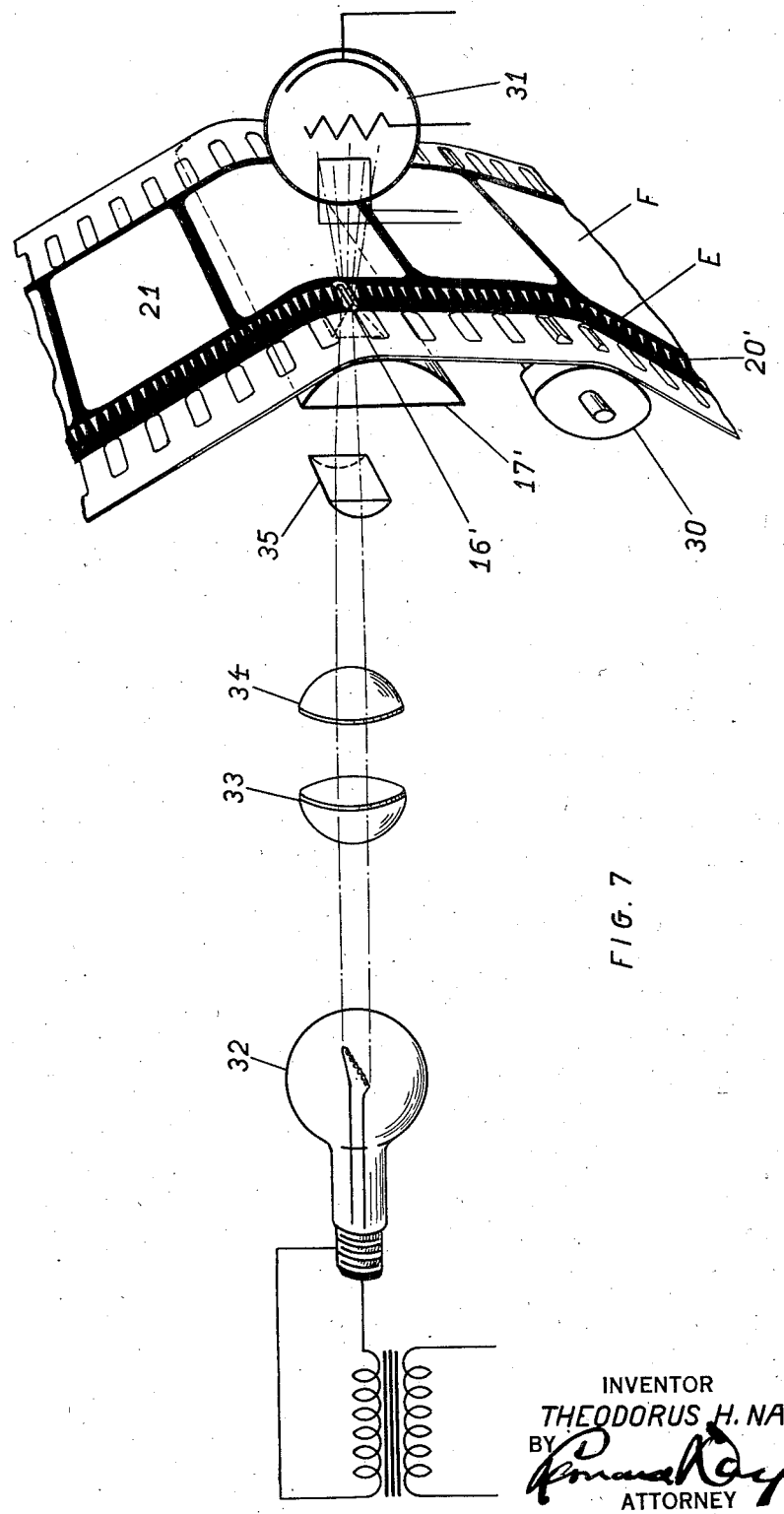

In an article published by me in the "Radio News" for November, 1925, entitled "Sound photographs and their reproduction", I described generally the use of the flame of the Gehrke tube modulated by sound for the production of a sound record and in Fig. 7 I have copied the diagrammatic reproducer system published on page 614 of said November Radio News, except that I have employed the same sound gate as that shown in Fig. 3 of this application. A similar description was made by me in a number of my foreign patents, among which are French Patent No. 548,568 dated October 25, 1922 and British Patent No. 176,796 dated June 8, 1923.

In all of these publications I omitted to describe how to employ the Gehrke tube or equivalent position-modulated source of light for the production of a noiseless photographic sound record.

In the apparatus and methods previously described by me for no sound, one portion of my photographic sound record was opaque to the passage of light and another portion transparent or translucent to the passage of light, wherefore whatever grain disturbance there might have been in the translucent or transparent portion of the film was transformed into noise in a sound projector.

In accordance with my present invention, I propose to limit the exposure of the traveling film negative exclusively to light exposure only when there is sound to be recorded, and to maintain it as to the sound band entirely unexposed for silence, whereby, after developing the negative, I am able in the positive to produce a sound record band the background of which is opaque and which, as to its transparent portions, is solely the desired sound record to be reproduced or projected.

In accomplishing this purpose, I prefer to employ the Gehrke tube arranged generally as described in my afore-cited publications, but in addition, to be provided with a shield blocking off all the light from the Gehrke tube except that which extends under sound modulation beyond a zero or neutral position, and to cause these modulated light waves to impinge upon a suitable traveling photographic film controlled in the usual manner for recording.

The above and further objects of my invention may better be understood by reference to the following specification and the accompanying drawings to which my claims are directed solely for purposes of illustration and not limitation.

Figures 1, 2:
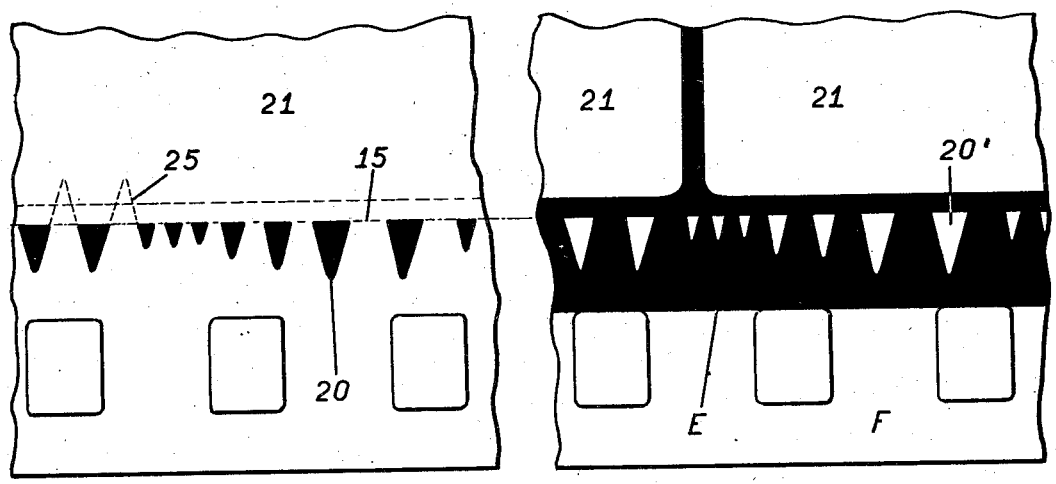
Figure 4:
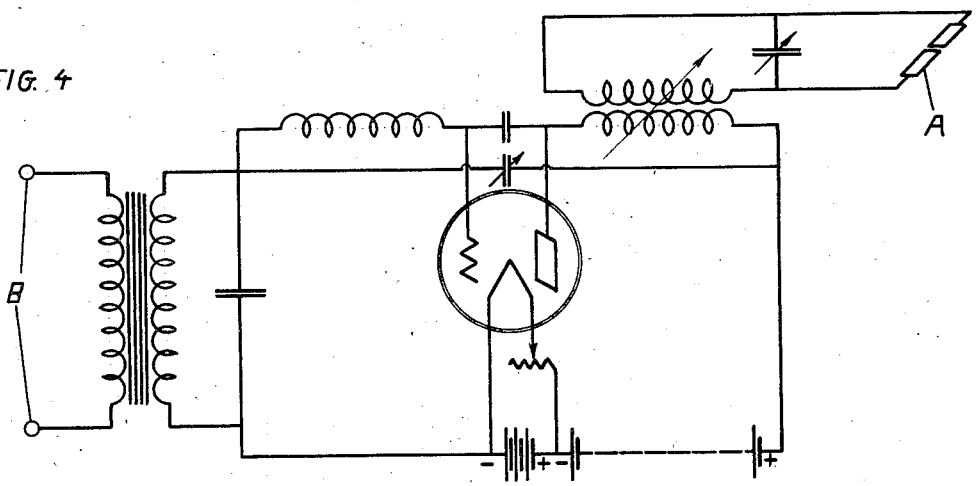
Figure 5:
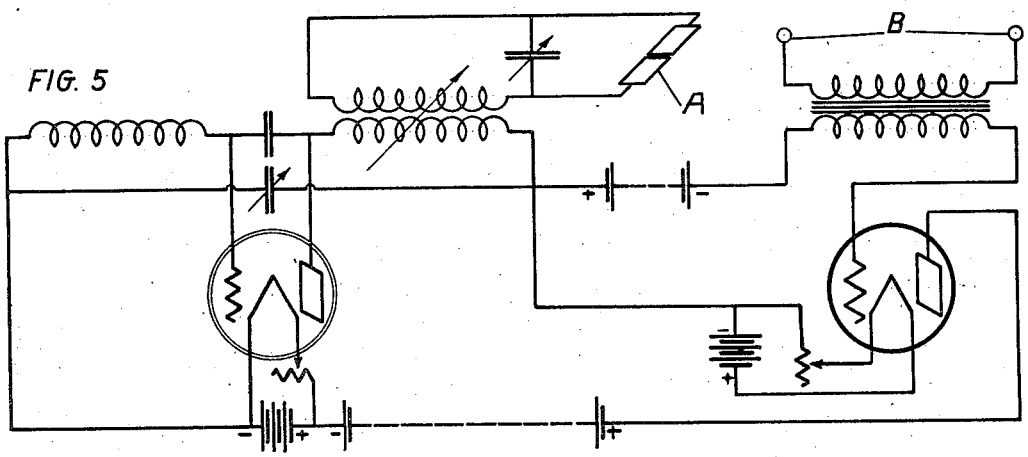
Figure 6:
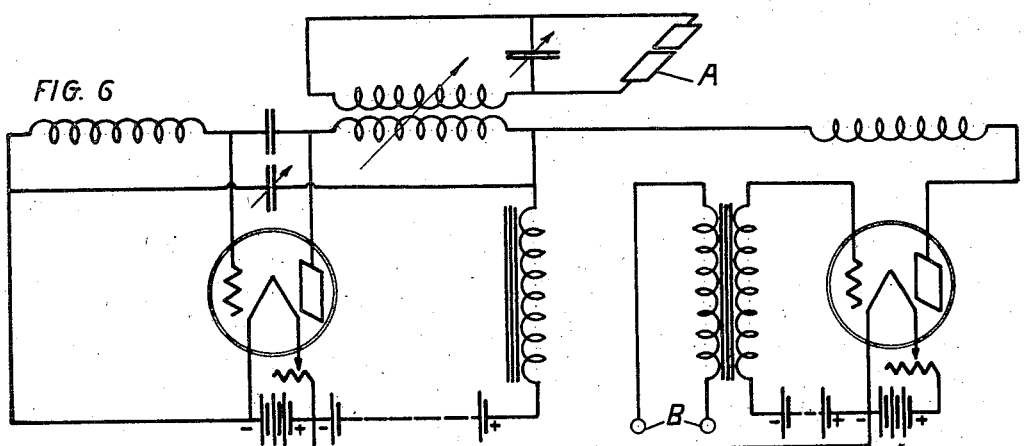

In the drawings, Fig. 1 is a diagrammatic plan view of a fraction of a film negative produced in accordance with my invention; Fig. 2 is a diagrammatic fractional view of a film positive produced in accordance with my invention; Fig. 3 is a diagrammatic perspective of the apparatus as to its various important parts and relationship for recording in accordance with my invention; Figs. 4, 5 and 6 are appropriate circuit diagrams for operating my Gehrke tube with appropriate sound modulation; and Fig. 7 is a diagrammatic representation of my sound reproducer system.

A Gehrke tube A, comprising essentially a transparent bulb 1 appropriately evacuated and filled with a cooperative atmosphere, has the terminals 2 and 3 connecting with electrodes 4 and 5, the nether surfaces of which are covered with appropriate coatings or coverings of insulation 6 and 7. This serves as the source of my variable light. The terminals of this tube are connected in any appropriate manner to any appropriate modulable exciting circuit. In Figs. 4 and 5 I have shown three such circuits, each of which comprises a source of high frequency oscillations modulated by an amplifying sound modulated electrical energy wave. Fig. 4 is described in my "Radio News" article referred to above. Fig. 5 shows a slight modification, and Fig. 6 is known in the art as the Colpitts type of circuit. In all of the diagrams the sound modulated electrical energy is applied to the terminals B from an appropriate source such as a commercial microphone and commercial amplifier apparatus.

The electrodes 4 and 5 of the Gehrke tube are preferably in the form of rectangular plates. The plane of the top surface of these plates is arranged at right angles to the plane of the portion of the traveling film F at which the light from the Gehrke tube is to impinge. The edges of these plates are also preferably at right angles to the direction of travel of the film and parallel to the transverse element of the film surface at the locality for the impinging light. It is a quality of a Gehrke tube arranged as I have described it to provide a sheet of top surface illumination for each electrode. These sheets are indicated by 8 and 9 in Fig. 3. The extent of these sheets of light away from the gap 10 increases to a maximum and decreases to a minimum for both.

With the apparatus electrically assembled as I have described, for no sound modulation both sheets of light 8 and 9 at radio frequency are generated and destroyed to an extent indicated by the dash lines in Fig. 3. The effect of modulation is to cause both of these sheets of light to extend outward from the gap 10 and inward towards the gap 10 in true conformity with the sound modulation. I arbitrarily designate the position of the sheet of light 9 as its zero or normal position for no sound and no modulation. I provide a shield C interposed so that the bottom 11 of its notch 12 just touches the light axis D of the optical system employed. The optical system employed is preferably a cylindrical lens 13 and a spherical lens 14. This light axis coincides with the zero line 15 of the sound track E and may pass through one of my prismatic quartz slits 16 carried in one of my curved sound gates 17 across which the film F is caused to travel in any one of the appropriate commercial manners, driven by appropriate commercial apparatus so as to produce a bend 18 at the locality of the sound gate.

The shield C, by reason of its notch 12, passes all plus extensions of the light sheet 9 to impinge upon the traveling film F to record the sound waves in the form of exposure portions or teeth 20.

The spaces 21 reserved for pictures are to be treated in any of the approved methods blanked off for future exposure or not used at all except on the positive.

After my negative film shown in Fig. 1 is developed, the teeth 20 recording the sound come out opaque. All of the negative portions of the light flame which would have been recorded and which are indicated by the dash lines 25 are omitted in this record by reason of the shield C.

The positive film F of Fig. 2 is printed in any appropriate manner and developed, after which the entire portion of the sound band E is opaque except for the sound records 20' themselves, which are translucent or transparent.

In reproduction of the sound recorded on film prints F such as that shown in Fig. 2, I prefer to use the same type of sound gate as shown in Fig. 2 and referred to by the numerals 16 and 17. In the reproducer system of Fig. 7 the same parts are designated 16' and 17'. The prismatic light gate proper 16' restricting the lateral spread of the light line across the traveling sound track E so that any slight weaving or irregular travel of the film by the usual guiding means such as the sprockets 30 does not cause the light passing through the film to the light sensitive device 31 to traverse any transparent or translucent portion except the actual light record itself 20' of the sound. In this system of Fig. 7, the light from a strong electric lamp 32 is concentrated by means of an objective and cylindrical lens system 33, 34 and 35, and is projected upon a very narrow slit 16'. The width of the slit is determined by the speed at which the film is run behind it and is preferably of the order of one-thousandth of an inch. The length of the slit or its dimension transverse to the travel of the sound band E is limited to a slight amount less than the width of this sound band. The film F is traveled uniformly at constant speed directly behind this slit 16' so that the light passing solely through the translucent sound record 20' is modulated as it falls upon the photo sensitive device 31, the minute electric responses of which are suitably amplified in accordance with any of my amplifier combinations or others now known to the art.

In this manner for recording sound on a film and reproducing it, nothing but the sound to be recorded is recorded and in the sound reproduction no error due to the grain of the film is passed to the photo sensitive device. I believe this to be perfect noiseless recording and reproduction of sound.

What is claimed and desired to be secured by United States Letters Patent is:

In combination in noiseless sound projection apparatus, an exciter lamp; a single light sensitive device; a sound record band adapted to travel between said exciter lamp and said single light sensitive device, all of which band is opaque to the passage of light rays except appropriately spaced and appropriately sized translucent portions corresponding to the sound recorded; and an optical system for projecting the light rays from said exciter lamp and causing them to impinge against substantially the full width of said band and to pass through all of the translucent portion of said band and to said single light sensitive device.

THEODORUS H. NAKKEN.